United States Patent
Boyd

[11] Patent Number: 5,974,820
[45] Date of Patent: Nov. 2, 1999

[54] REFRIGERANT CYLINDER JACKET CONSTRUCTION

[76] Inventor: Kenneth E. Boyd, 6813 W. Forrest Rd., #102, Landover, Md. 20785

[21] Appl. No.: 09/035,044

[22] Filed: Mar. 5, 1998

[51] Int. Cl.⁶ .................................................. F25B 45/00
[52] U.S. Cl. ................................... 62/292; 219/529
[58] Field of Search ..................... 62/292, 149, 77, 62/125, 371; 165/46; 219/528, 529; 220/592.23, 592.24, 903

[56] References Cited

U.S. PATENT DOCUMENTS

| | | | |
|---|---|---|---|
| 4,532,410 | 7/1985 | Wehmeyer | 219/211 |
| 5,361,605 | 11/1994 | Pizzi et al. | 62/530 |
| 5,377,495 | 1/1995 | Daigle | 62/125 |
| 5,511,387 | 4/1996 | Tinsler | 62/292 |
| 5,557,940 | 9/1996 | Hendricks | 62/149 |
| 5,827,050 | 10/1998 | Price | 417/207 |
| 5,906,763 | 5/1999 | Wheeler | 219/386 |

OTHER PUBLICATIONS

Briskheat Insulated Drum Blanket Heaters catalog page.

*Primary Examiner*—William Doerrler
*Attorney, Agent, or Firm*—Henderson & Sturm

[57] ABSTRACT

A temperature controlled insulated jacket construction 10 for encircling the top, bottom, and side of a refrigerant drum 100. The jacket construction 10 includes an inner panel member 40 that encircles the drum 100 in the horizontal orientation, an outer panel member 20 that encircles both the inner panel member 40 and the drum 100 in the vertical orientation, and a temperature controlled heating unit 13 disposed within the inner panel member 40.

9 Claims, 2 Drawing Sheets

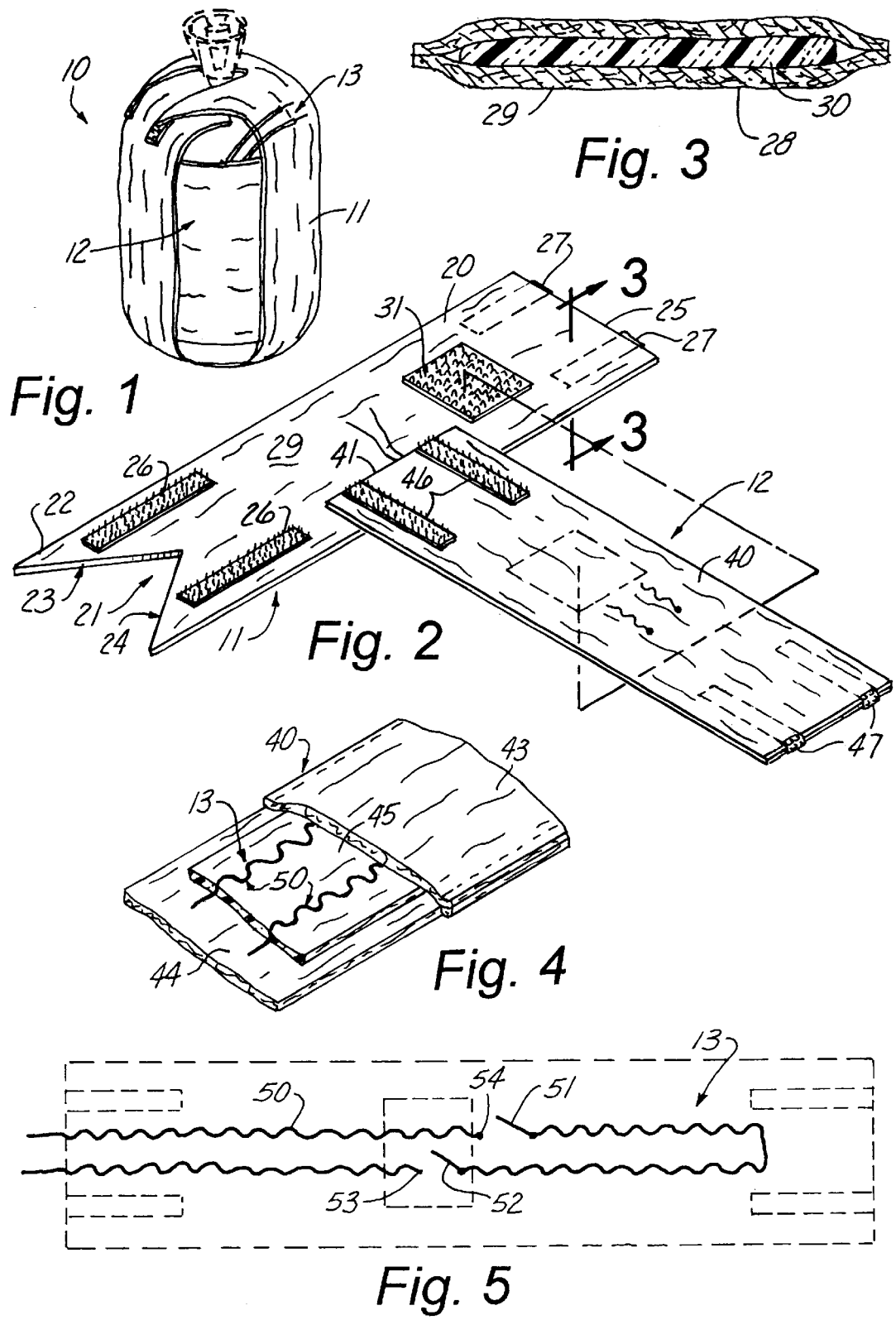

REFRIGERANT CYLINDER JACKET CONSTRUCTION

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the field of insulating cover devices in general, and in particular to a two piece insulated and temperature controlled jacket for refrigerant cylinders.

2. Description of Related Art

As can be seen by reference to the following U.S. Pat. Nos. 5,377,495; 5,557,940; and 5,511,387, the prior art is replete with myriad and diverse refrigerant insulating arrangements.

While all of the aforementioned prior art constructions are more than adequate for the basic purpose and function for which they have been specifically designed, they are uniformly deficient with respect to their failure to provide a simple, efficient, and practical device for both insulating the exterior of a refrigerant drum and maintaining the temperature of the refrigerant drum within a desired temperature range when charging an air conditioner refrigeration and system during low ambient temperature conditions.

As anyone in the heating and air conditioning trade is well aware, low ambient temperatures reduce the effective PSIG within a refrigerant drum to the point that the air conditioner or refrigeration system cannot be effectively charged without first elevating the temperature of the refrigerant drum to increase the PSIG within the drum to acceptable levels.

For example, when changing out a 5 ton heat pump compressor at 10° F. ambient temperature, the pressure of an R22 tank is 32.8 PSIG. Therefore, in order to charge this heat pump to the correct pressure, the charge will have to be weighed in; however, the internal pressure of the R22 tank is too low to accomplish this task.

Some of the prior art methods of elevating the temperature of the refrigerant drum have involved the use of hot water, placing the drum on a heated plate and/or subjecting the exterior surface of the refrigerant drum to the flame of a torch. All of these aforementioned methods are both impractical and extremely dangerous in that all refrigerant drums have a relief disc which discharges the refrigerant to the atmosphere under high pressure usually precipitated when the temperature of the tank exceeds 120° F.

The ideal conditions for charging a refrigeration and air conditioning system occur when the external temperature of the drum is 90° F. which produces an internal pressure within the drum of 168 PSIG so the acceptable temperature range for accomplishing this task will fall between 80° F. and 100° F. under most circumstances.

As a consequence of the foregoing situation, there has existed a longstanding need in the heating and air conditioning trades for a construction for raising the temperature of refrigerant drums or cylinders and the provision of such a construction is a stated objective of the present invention.

BRIEF SUMMARY OF THE INVENTION

Briefly stated, the temperature controlled insulated jacket construction that forms the basis of the present invention comprises in general, a vertical panel unit dimensioned to surround the top, bottom and sides of a refrigerant drum and a temperature controlled heating unit disposed within the horizontal panel unit for raising the temperature of the refrigerant drum.

As will be explained in greater detail further on in the specification, the horizontal panel unit comprises a generally rectangular inner panel member which contains the heating unit which includes an electrical resistance heating member equipped with a sensor controlled high temperature limit switch and an on-off thermostat switch calibrated for a specific temperature range.

In addition, the vertical panel unit comprises another generally rectangular outer panel member adapted to engage the inner panel member to form a generally cruciform configuration. The outer panel member is notched and provided with a pair of arm elements that will receive the neck portion of the refrigerant drum such that the inner and outer panel members will envelope the top, bottom, and sides of the refrigerant drum.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein:

FIG. 1 is a perspective view of the insulating jacket that forms the basis of this invention wrapped around a refrigerant cylinder;

FIG. 2 is an exploded perspective view of the main components of the insulating jacket;

FIG. 3 is a cross-sectional view taken through line 3—3 of FIG. 2;

FIG. 4 is an isolated detail view of a portion of the internal heating element;

FIG. 5 is a schematic view of the heating unit;

DETAILED DESCRIPTION OF THE INVENTION

Figure 6:
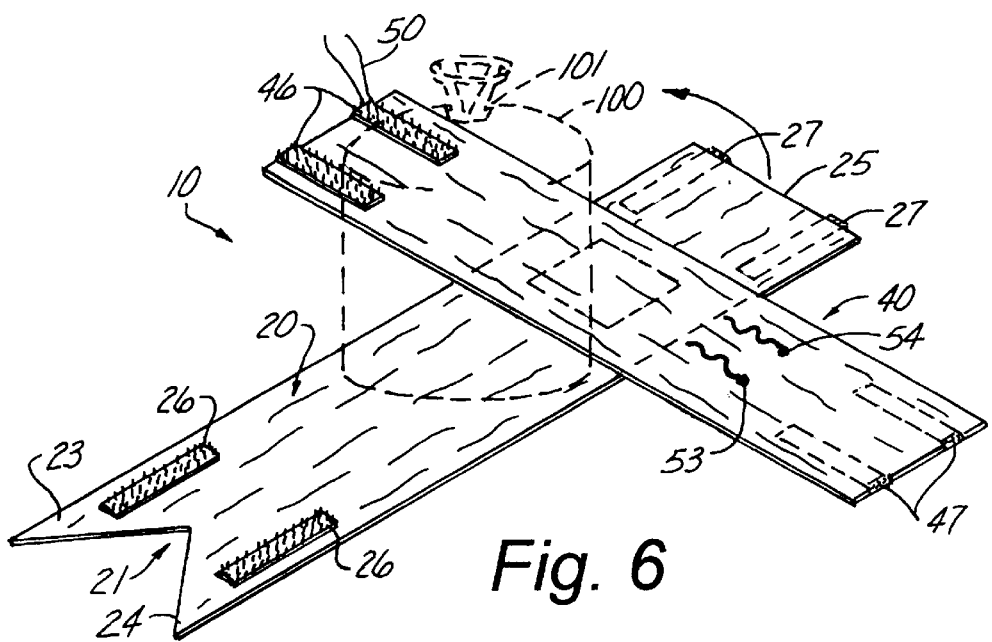
FIG. 6 shows the insulating jacket prior to enveloping the refrigerant cylinder.

As can be seen by reference to the drawings, and in particularly to FIG. 1, the temperature controlled insulating jacket construction that forms the basis of the present invention is designated generally by the reference number 10. The jacket construction 10 comprises in general, a vertical panel unit 11, a horizontal panel unit 12, and an internal temperature controlled heating unit 13. These units will now be described in seriatim fashion.

As can best be seen by reference to FIGS. 2 and 6, the vertical panel unit 11 comprises a first outer elongated generally rectangular panel member 20 having an enlarged V-shaped notch 21 formed on one end 22 wherein the notch 21 defines a pair of angled arm elements 23, 24 whose purpose and function will be described in greater detail further on in the specification.

Figure 8:
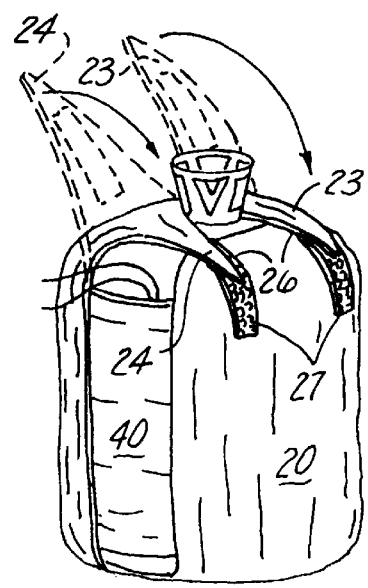
FIG. 8 shows the insulating jacket operatively surrounding the refrigerant cylinder.

In addition, as shown in FIGS. 2, 6, and 8, the notched end 22 and the opposite end 25 of the first panel member 20 are provided with strips of cooperating hook and loop fasteners 26, 27 for wrapping the first panel member 20 in a vertical orientation around a refrigerant cylinder 100. The notch 21 is dimensioned to receive the neck 101 of the refrigerant drum or cylinder 100. The arm elements 23, 24 are dimensioned to pass on either side of the cylinder neck 101 such that the cooperating hook and loop fasteners 26, 27 can be operatively engaged with one another.

Turning now to FIGS. 2 and 3, it can also be seen that the outer panel member 20 is provided with an outer cover element 28, an inner cover element 29, and an intermediate insulating pad element 30. The inner cover element 29 is further provided with an enlarged hook and loop fastening component 31 whose purpose and function will be described presently.

As shown in FIGS. 2, 4, and 6, the horizontal cover unit 12 comprises a second generally rectangular inner panel member 40 whose opposite ends 41 and 42 are disposed parallel to one another. The inner panel member 40 includes an inner cover element 43, an outer cover element 44, and an intermediate insulating pad element 45. The heating unit 13 is disposed between the insulating pad element 45 and the inner cover element 43 of the inner panel member 40.

Figure 7:
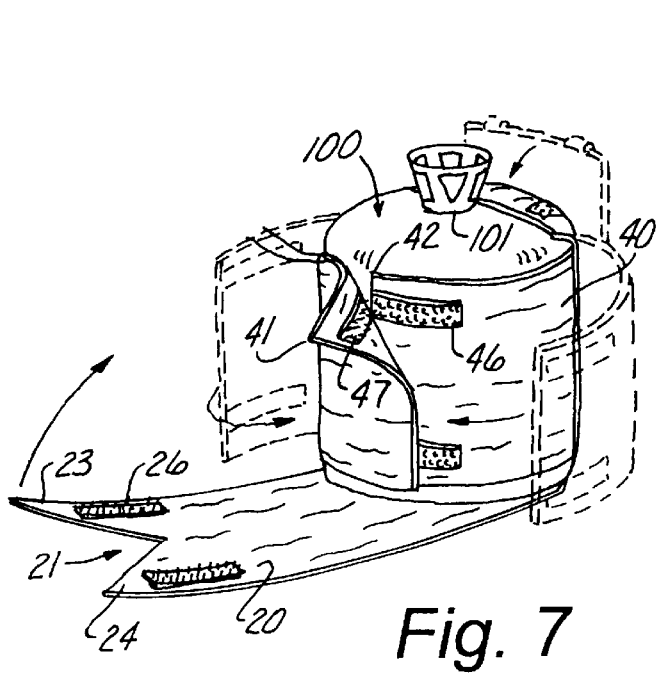
FIG. 7 shows the insulating jacket partially enveloping the refrigerant cylinder.

As can best be seen by reference to FIGS. 2, 6, and 7, the inner panel member 40 is provided with strips of cooperating hook and loop fasteners 46 and 47 and the outer cover element 44 is provided with an enlarged hook and loop fastening component 48 which cooperates with the enlarged hook and loop fastening component 31 on the outer panel member 20 to join the inner 40 and the outer 20 panel members together in a generally cruciform configuration as shown in FIG. 6.

Turning now to FIGS. 4 and 5, it can be seen that the heating unit 13 comprises an electrical resistance heating member 50 provided with a first high limit cut out switch 51 set to interrupt the flow of electricity to the heating member 50 when a first external drum temperature sensor 53 detects a temperature above 120° F., a second on-off thermostat switch 52 which is normally energized when a second external drum temperature sensor 54 detects a drum temperature below 80° F. The on-off thermostat switch will remain energized until the second external drum temperature sensor 54 detects a drum temperature of 95° F. as explained in detail further on in the specification.

As can best be seen by reference to FIGS. 6 through 8, the temperature controlled insulated jacket construction 10 is employed to surround by the horizontal periphery, as well as the top and bottom of a refrigerant drum or cylinder 100. In order to accomplish this objective, the inner 40 and outer 20 panel members are arranged in the generally cruciform configuration depicted in FIG. 6, and the refrigerant drum 100 is disposed on the outer panel member 20 just below the cross arms of the cruciform configuration.

Once the refrigerant drum 100 is positioned on the outer panel member 20, the inner panel member 40 is wrapped in a horizontal direction around the drum 100 to position the temperature sensors 53, 54 against the external periphery of the drum 100, and the opposite ends 41, 42 of the inner panel member 40 are joined together by the hook and loop fastener strips 46, 47 in a well recognized fashion.

At this juncture as shown in FIGS. 7 and 8, the outer panel member 20 is wrapped in a vertical direction around both the inner panel member 40 and the drum 100 such that the arm elements 23 and 24 are disposed on either side of the neck 101 of the drum 100 and that the top, bottom, and sides of the drum are enveloped by the jacket construction 10.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooded parts together, whereas, a screw employs a helical surface, in the environment of fastening wooden parts, a nail and a screw may be equivalent structures.

I claim:

1. A temperature controlled insulated jacket construction for enveloping a conventional refrigerant drum having a neck portion wherein the jacket construction comprises:

a first panel member dimensioned to encircle the external periphery of the refrigerant drum in a horizontal orientation; and a second panel member operatively associated with the first panel member and dimensioned to encircle both the first panel member and the refrigerant drum in a vertical orientation.

2. The jacket construction as in claim 1 further including:

means for engaging the first panel member to the second panel member in a generally cruciform configuration.

3. The jacket construction as in claim 2 further including:

a temperature controlled heating unit disposed within said first panel member.

4. The jacket construction as in claim 3 wherein said heating unit includes an electrical resistance heating member.

5. The jacket construction as in claim 4 wherein said heating unit further comprises a high limit cut-off switch, an on-off thermostat switch and at least one temperature sensor.

6. The jacket construction as in claim 3 wherein both the first and second panel members are provided with an outer cover element, an inner cover element and an intermediate insulating pad element.

7. The jacket construction as in claim 6 wherein said heating unit is disposed between the intermediate insulating pad element and the outer cover element.

8. The jacket construction as in claim 1 wherein said second panel member is provided with a notch which is dimensioned to receive the neck portion of the refrigerant drum.

9. The jacket construction as in claim 8 wherein the notch defines two arm elements that extend past the neck portions of the refrigerant drum.

* * * * *